United States Patent [19]
Linzenkirchner

[11] Patent Number: 5,706,193
[45] Date of Patent: Jan. 6, 1998

[54] CONTROL SYSTEM, ESPECIALLY FOR A NON-LINEAR PROCESS VARYING IN TIME

[75] Inventor: Edmund Linzenkirchner, Eggenstein-Leopoldshafen, Germany

[73] Assignee: Siemens Aktiengesellschaft, München, Germany

[21] Appl. No.: 571,841

[22] PCT Filed: Jun. 20, 1994

[86] PCT No.: PCT/DE94/00699

§ 371 Date: Dec. 26, 1995

§ 102(e) Date: Dec. 26, 1995

[87] PCT Pub. No.: WO95/01589

PCT Pub. Date: Jan. 12, 1995

[30] Foreign Application Priority Data

Jun. 29, 1993 [DE] Germany ............... 43 21 604.8

[51] Int. Cl.$^6$ ............................................. G05B 13/02
[52] U.S. Cl. ..................... 364/148; 364/160; 395/61
[58] Field of Search ............................. 364/148, 151, 364/152, 164, 165, 160, 161, 162, 163, 180, 181; 395/3, 61, 900; 318/590, 591, 597, 598

[56] References Cited

U.S. PATENT DOCUMENTS

| | | | |
|---|---|---|---|
| 3,882,368 | 5/1975 | Carleton | 318/610 |
| 3,940,593 | 2/1976 | Bleak et al. | 364/181 |
| 4,509,000 | 4/1985 | Ferguson | 318/591 |
| 4,992,927 | 2/1991 | Araki | 364/160 |
| 5,184,122 | 2/1993 | Decious et al. | 340/870.16 |
| 5,289,095 | 2/1994 | Ushiyama | 318/560 |

OTHER PUBLICATIONS atp Automatisierungstechnische Praxis, vol. 34, No. 8, Aug. 1992, Karlsruhe, FRG, pp. 451–460, H. Preuss et al.: *Fuzzy Control—Werkzeugunterstützte Funktionsbaustein-Realisierung für Automatisierungsgeräte und Prozeßleitsysteme* (*Fuzzy Control—Tool-aided Function Block Realisation for programamble Controllers and Distributed Process Control Systems*).

1992 IEEE International Conference on Systems Man and Cybernetics, vol. 2, 18 Oct. 1992, Chicago, US, pp. 1603–1608, J. Zheng et al: *STFC–Self-Tuning Fuzzy Controller*.

*Primary Examiner*—Joseph Ruggiero
*Attorney, Agent, or Firm*—Kenyon & Kenyon

[57] ABSTRACT

A control system, especially for a non-linear process varying in time, includes a first controller, in particular a linear PID controller, which is able to be switched over via a switching input between the "tracking" and "control" operating modes, and a second controller, which is advantageously a fuzzy controller. One output of the second controller leads to the tracking input of the first controller; at another output, a switching signal (S) is output which determines the operating mode of the first controller. The control device is applied in process automation.

10 Claims, 1 Drawing Sheet

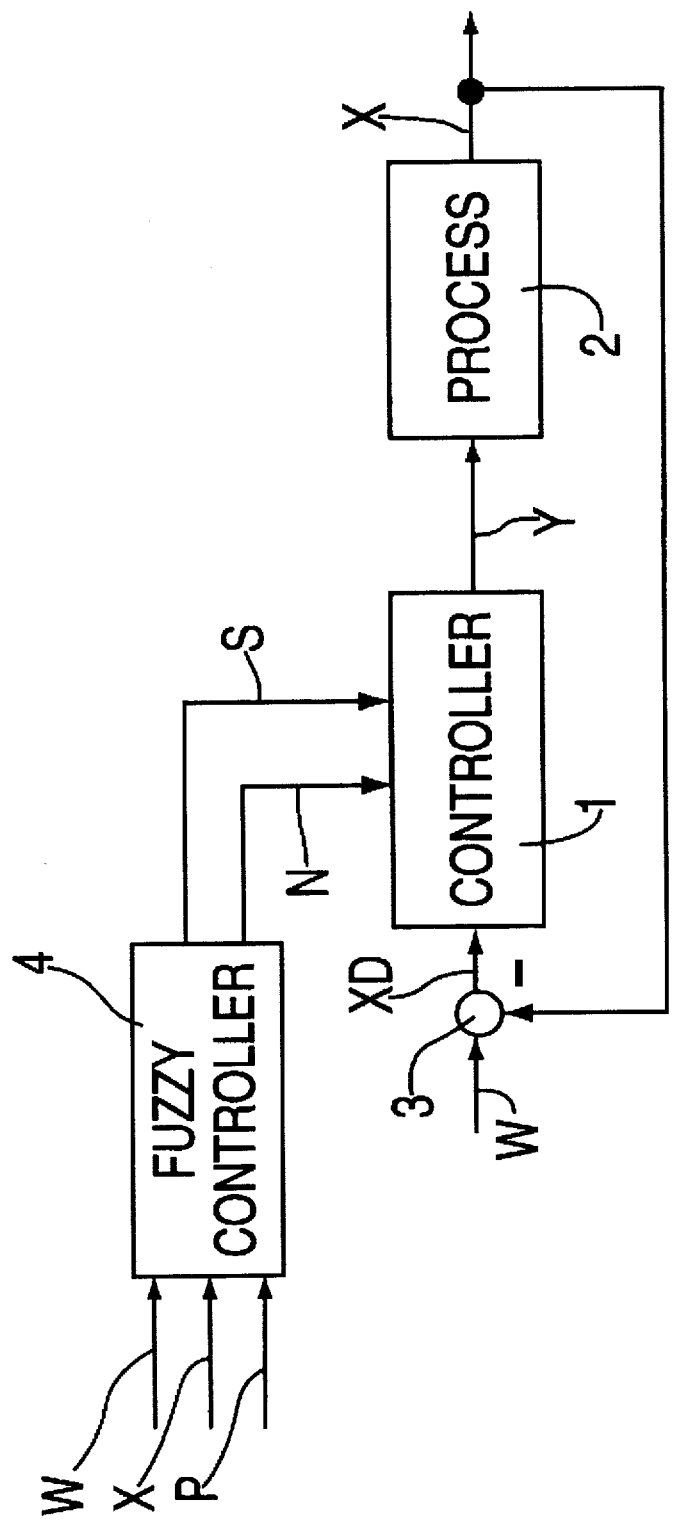

CONTROL SYSTEM, ESPECIALLY FOR A NON-LINEAR PROCESS VARYING IN TIME

BACKGROUND OF THE INVENTION

The present invention relates generally to control systems, and more particularly to a control system for a non-linear process varying in time, which includes two controllers, one of which is a linear PID controller, by means of which a manipulated variable (y) is determined from a comparison between a reference variable (w) and a controlled variable (x).

When conventional controllers, e.g. linear PID controllers, are used to control real processes, various problems arise. For non-linear processes, in particular, the parameters of a linear controller are only optimal for one operating point of the process. When working with discontinuous processes, changing operating points occurs when starting and stopping the process. The consequence may be an inadequate control response when a linear controller is used. In the same way, time-variant processes, whose behavior is variable because of external influences, such as fluctuating raw material quality, are problematic for linear controllers. In addition, in many processes there are interactions between individual process variables. When working with a conventional closed-loop control, the process is usually controlled with single-variable controllers. With this procedure, a plurality of single-loop control systems are employed, one for each of the individual process variables, while the interactions are disregarded. As a result, in certain process states, the closed-loop control may develop an unsatisfactory response, or instabilities may even occur. To resolve these problems, so-called higher control processes, e.g. with adaptive controllers, state controllers or model-supported controllers, are used. In practice, however, these higher control processes are only used infrequently, because their application presupposes extensive theoretical knowledge, and presupposes a process for which a mathematical model can be developed. The resultant outlay is often very high; to some degree, it is even impossible to describe a process mathematically. Therefore, in practice, a system operator must often intervene in the process, because, based on his experience, he will be able to recognize process states where the desired process behavior is not guaranteed by the conventional automatic control. The disadvantage associated with this is that because system operators have different levels of experience or even because their job performance can change from day to day, the result is a process control that is not reproducible.

The essay, "Fuzzy Control—werkzeugunterstützte Funktionsbaustein-Realisierung für Automatisierungsgeräte und Prozeßleitsysteme" ["Fuzzy Control—Realizing Functional Modules for Automation Systems and Process Control Systems through the Support of Software Tools"] by Dr. Hans-Peter Preuß, Edmund Linzenkirchner and Steffen Alender, published in "atp" 34 (1992) issue 8, pp. 451–460, discusses avoiding these problems by adding a second controller to the conventional controller. It mentions using the output of the second controller for correcting manipulated variables, in order to support the conventional controller, as needed. In addition, the parameters Kp and Tv of the conventional PID controller are adapted with a further controller to the changing process dynamics. When these additional controllers are switched on, sudden changes in manipulated variables occur disadvantageously, which can lead to surge loads on the final controlling elements and, thus, to their rapid deterioration.

The present invention is directed to the problem of developing a control system, especially for a non-linear process varying in time, by using several controllers where surge loads on the final controlling elements caused by sudden changes in manipulated variables are avoided.

SUMMARY OF THE INVENTION

The present invention solves this problem by providing a control system of the type mentioned at the outset, in which: (1) the first controller is able to be switched over via a switching input between a "tracking" and a "control" operating mode, in the "tracking" operating mode, the manipulated variable (y) is specified by a variable (N) applied to a tracking input, and when switching over to the "control" operating mode, the manipulated variable (y) is adjusted to conform with the parameters of the first controller so that no sudden change in manipulated variables occurs; (2) one output of the second controller leads to the tracking input of the first controller; and (3) a device is provided for generating a signal (S) during certain process states, which is fed to the switching input of the first controller and determines its operating mode.

One advantageous embodiment of the control system according to the present invention provides that when working with a discontinuous process, the signal (S) is generated so that the first controller is operated close to a quasi-steady-state operating point in the "control" operating mode and, when starting and shutting down the process, the first controller is operated in the "tracking" operating mode.

Another advantageous embodiment of the control system according to the present invention provides that the second controller is a fuzzy controller.

Yet another advantageous embodiment of the control system according to the present invention provides that when the second controller is a fuzzy controller the signal (S) fed to the switching input is generated by the fuzzy controller.

Yet another advantageous embodiment of the control system according to the present invention provides that, when the second controller is a fuzzy controller, besides the reference variable (w) and the control variable (x), still other process variables (p) are supplied to the fuzzy controller.

The present invention has the advantage that, with comparatively little outlay, a reproducible, fully automatic process control can be achieved, where manual intervention by a system operator is no longer needed. By using a fuzzy controller as an additional controller, there is no need to construct exact mathematical models for problematic non-linear or time-variant processes, which often turn out to be very costly. The invention has an especially advantageous effect on discontinuous processes, since the advantages of conventional controllers can be utilized close to a quasi-steady-state operating point, and the advantages of non-linear controllers can be utilized when starting and shutting down the process. In accordance with the present invention, a smooth changeover of the control system is achieved.

BRIEF DESCRIPTION OF THE DRAWINGS

The sole FIGURE shows a block diagram of a closed-loop control circuit comprising a control system in accordance with the present invention.

DETAILED DESCRIPTION

A manipulated variable y for a process 2 is generated using a conventional controller 1. A suitable measuring transducer is used to detect a controlled variable x of the process 2 which is then subtracted in a comparator 3 from a reference variable w to produce a system deviation xD. This system deviation xD is supplied, in turn, to the controller 1 in order to close the control loop. The controller 1 may be operated in two ways: in the "control" operating mode, in which the manipulated variable y is defined solely by the function of the controller 1 in dependence upon the system deviation xD, and in the "tracking" operating mode, in which the manipulated variable y is predetermined by a variable N being applied to a tracking input. A switching signal S, which is applied to a switching input of the controller 1, is used to switch over the operating mode. The two signals N and S are generated by a fuzzy controller 4 from the reference variable w, the controlled variable x, and other process variables p. While the controller 1 is effective within a narrow range around a steady-state operating point, when working with the fuzzy controller 4, empirical strategies of the system operators are realized when starting and shutting down the process. By this means, a fully automatic, reproducible process control is achieved.

The designing of a fuzzy controller can be roughly divided into three steps: defining of the input/output variables; defining of linguistic values for the input/output variables by establishing membership functions; and defining rules while using the linguistic values for realizing the desired strategy. Therefore, to be able to realize the empirical strategies of system operators in the fuzzy controller 4, first those process variables must be determined, which, when evaluated, make it possible to recognize the process states requiring manual intervention. These represent the input variables for the fuzzy controller 4. If variables are relevant for assessing the process state, which are able to be formed through calculations (e.g. differentiation, combining several process variables mathematically, or filtering), then these calculations are realized as a conventional preprocessing, and the results are supplied as input variables to the fuzzy controller. The variables for intervening in the process 2 are given by those controllers on which the manual interventions take place. These variables are the output variables of the fuzzy controller 4. After that, one determines the value ranges for all input/output variables of the fuzzy controller 4, which make it possible to recognize the process states in which manual interventions can follow or into which the range of manipulated variables can be subdivided in conformance with manual interventions that took place previously. Linguistic terms, e.g. "small", "medium" or "large" are assigned to these value ranges. Using the above-defined input/output variables and value ranges, the empirical strategies carried out up until this point are then described in the form of rules, which are comprised in each case of a conditional component, in which linguistic terms for value ranges of input variables of the fuzzy controller 4 are combined with one another by an AND- or an OR-operation, and of an inference component, in which the desired intervention in the process 2 is described, likewise using linguistic descriptions of value ranges of the output variables. These value ranges are implemented as fuzzy quantities in the form of membership functions for fuzzification of the input variables or for defuzzification of the output variables. A special case is the switch-over signal S for switching over the operating modes of the controller 1, whose value ranges correspond to sharp quantities. The determined empirical strategy is implemented in the form of fuzzy rules in a control action.

To guarantee a smooth transition from fuzzy control to conventional control, immediately after the changeover, the conventional controller 1 takes on the variable N last specified by the fuzzy controller 4 at the tracking input as a manipulated variable y. When working with a PID controller, this can be achieved in that the integral-action component of the controller, corrected by the proportional and differential component, is adapted to the variable N in conformance with the characteristic curve of xD. The transfer from conventional control to fuzzy control is established in the fuzzy controller 4 by the membership functions. A smooth transition can be effected here by optimizing the membership functions in the transfer range.

I claim:

1. A control system comprising:
    a) a first controller determining a manipulated variable (y) from a comparison between a reference variable (w) and a controlled variable (x), said first controller including a tracking operating mode and a control operating mode, including a tracking input, and including a switching input for selecting either the tracking or the control operating mode, wherein in the tracking operating mode the manipulated variable (y) is specified by a variable (N) applied to the tracking input, and when switching over to the control operating mode, the manipulated variable (y) is adjusted to conform with parameters of the first controller so that no sudden change in the manipulated variable occurs; and
    b) a second controller having a first output coupled to the tracking input of the first controller, and having a second output coupled to the switching input of the first controller, said second controller generating a signal (S) during certain process states, which signal (S) is output via the second output to the switching input of the first controller and determines the operating mode of the first controller.

2. The control system according to claim 1, wherein when working with a discontinuous process, the signal (S) is generated so that the first controller is operated close to a quasi-steady-state operating point in the control operating mode and, when starting and stopping the process, the first controller is operated in the tracking operating mode.

3. The control system according to claim 2, wherein the second controller comprises a fuzzy controller.

4. The control system according to claim 3, wherein the signal (S) fed to the switching input is generated by the fuzzy controller.

5. The control system according to claim 4, wherein in addition to the reference variable (w) and the control variable (x), other process variables (p) are supplied to the fuzzy controller.

6. A control system for a non-linear process in time comprising:
    a) a linear PID controller determining a manipulated variable (y) from a comparison between a reference variable (w) and a controlled variable (x), said PID controller including a tracking operating mode and a control operating mode, including a tracking input, and including a switching input for selecting either the tracking or the control operating mode, wherein in the tracking operating mode the manipulated variable (y) is specified by a variable (N) applied to the tracking input, and when switching over to the control operating mode, the manipulated variable (y) is adjusted to conform with parameters of the PID controller so that no sudden change in the manipulated variable occurs; and
    b) an additional controller having a first output coupled to the tracking input of the PID controller, and having a second output coupled to the switching input of the PID controller, said additional controller generating a signal (S) during certain process states, which signal (S) is output via the second output to the switching input of the PID controller and determines the operating mode of the PID controller.

7. The control system according to claim 6, wherein when working with a discontinuous process, the signal (S) is generated so that the PID controller is operated close to a quasi-steady-state operating point in the control operating mode and, when starting and stopping the process, the PID controller is operated in the tracking operating mode.

8. The control system according to claim 6, wherein the additional controller comprises a fuzzy controller.

9. The control system according to claim 8, wherein the signal (S) fed to the switching input is generated by the fuzzy controller.

10. The control system according to claim 9, wherein in addition to the reference variable (w) and the control variable (x), other process variables (p) are supplied to the fuzzy controller.

* * * * *